UNITED STATES PATENT OFFICE.

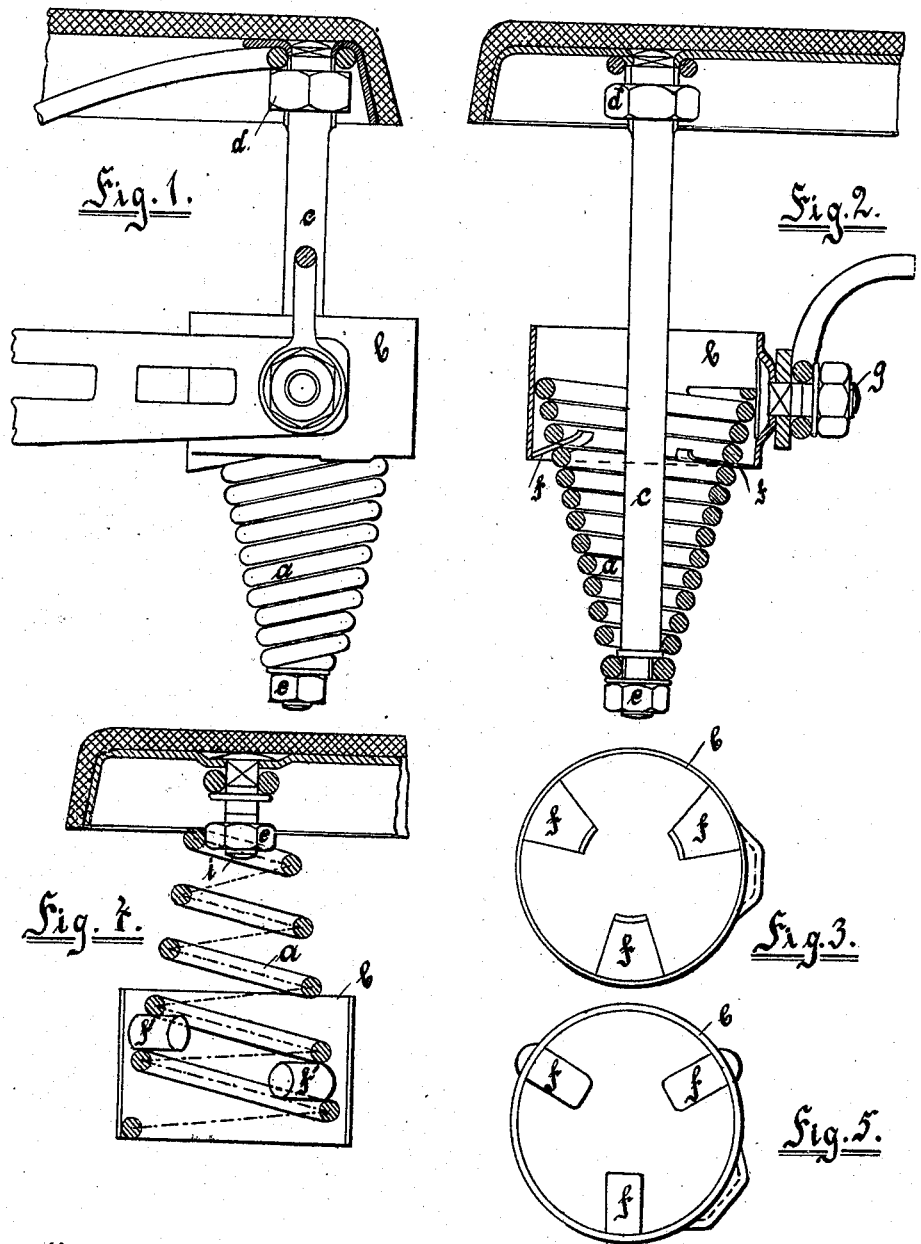

KURT GERISCH AND MAX GERISCH, OF CHEMNITZ, GERMANY.

SPRING-FASTENING.

No. 924,341.　　　Specification of Letters Patent.　　　Patented June 8, 1909.

Application filed May 28, 1908. Serial No. 435,392.

*To all whom it may concern:*

Be it known that we, KURT GERISCH and MAX GERISCH, both subjects of the German Emperor, and residents of Chemnitz, Sachsen, Germany, have invented certain new and useful Improvements in Spring-Fastenings, of which the following is a specification.

In comparison with the present known spring fastenings the adjustable fastening of screw-springs has the advantage that it may be employed for screw-springs of different space diameters and especially for screw-springs of conical shape.

The accompanying drawing shows the novelty applied to a bicycle-saddle, but it is adapted also for other purposes.

Figure 1 shows a side-view of the manner of hanging up the spring for a drag-spring arrangement. Fig. 2 gives an axial section according to Fig. 1. Fig. 3 represents a form of construction of the spring-fastening in a top-view. Fig. 4 is an axial section according to Fig. 2 but for a tension spring-arrangement. Fig. 5 gives a further form of construction of the spring-fastening in a top-view.

The spring $a$ is held on the screw-bolt $c$ on the one end by means of a nut $e$ and on the other end in a casing $b$ provided with clutches $f$ (Fig. 2), which casing is fastened to the frame by a screw $g$. The clutches $f$ catch from the outside into the spring-spires.

In the example represented in Figs. 1 and 2 the regulation is effected by loosening the nut $e$ when the spring by a simple turning to the right or to the left around its own axis is screwed into or out of the casing $b$. In such a way any number of threads of the spring may be set in or out of action, and the diameter of the turns may be enlarged or diminished at the end caught by the clutches $f$ whereby the tension of the spring is altered while undergoing the same pressure.

The object of the invention may be employed for expansible-springs as well as for compressing-springs (Fig. 4). In this latter case the shape of the clutches $f'$ which are arranged on the casing $b$ (Fig. 5) must be fitted to the open spring-turns.

After having regulated the spring $a$ it is fixed by screwing on the nut $e$.

We claim:

In the improvements in spring fastenings especially for bicycle-saddles with springs, the combination of a conical spring ($a$) a screw-bolt ($c$) situated in the geometrical axis of said spring and turnably mounted on the one end of said spring, means for rigidly fastening said end of the spring on said screw-bolt, a casing ($b$) on the other end of said spring, means affixed to the said casing and engaging the free room between two neighboring windings of said other end of the spring, said means being rotatable to regulate the tension and the diameter of the windings.

KURT GERISCH.
　　　　　　　　　　MAX GERISCH.

Witnesses:
　　WILLIAM J. KONJETSNY,
　　HERBERT APPLEYARD.